US010631186B1

(12) United States Patent
Krout

(10) Patent No.: US 10,631,186 B1
(45) Date of Patent: Apr. 21, 2020

(54) MULTI-THREAD TX/RX AND VIDEO DATA TO IMPROVE THROUGHPUT AND RELIABILITY OVER CELLULAR BASED COMMUNICATIONS SYSTEMS

(71) Applicant: Unmanned Aerial Systems Safeflight Inc., Columbia, MD (US)

(72) Inventor: Tim Krout, Columbia, MD (US)

(73) Assignee: Unmanned Aerial Systems Safeflight Inc., Columbia, MD (US)

(*) Notice: Subject to any disclaimer, the term of this patent is extended or adjusted under 35 U.S.C. 154(b) by 0 days.

(21) Appl. No.: 16/170,586

(22) Filed: Oct. 25, 2018

Related U.S. Application Data

(63) Continuation-in-part of application No. 15/225,496, filed on Aug. 1, 2016, now Pat. No. 10,129,884, which is a continuation of application No. 15/017,503, filed on Feb. 5, 2016, now abandoned.

(60) Provisional application No. 62/112,414, filed on Feb. 5, 2015.

(51) Int. Cl.
*H04W 24/08* (2009.01)
*H04W 72/08* (2009.01)
*H04L 29/08* (2006.01)
*H04W 84/04* (2009.01)

(52) U.S. Cl.
CPC ............ *H04W 24/08* (2013.01); *H04L 67/12* (2013.01); *H04W 72/085* (2013.01); *H04W 84/042* (2013.01)

(58) Field of Classification Search
CPC . H04W 24/08; H04W 72/085; H04W 84/042; H04L 67/12
See application file for complete search history.

(56) References Cited

U.S. PATENT DOCUMENTS

| | | | |
|---|---|---|---|
| 7,319,669 B1* | 1/2008 | Kunz | H04L 47/36 370/235 |
| 8,437,788 B2* | 5/2013 | Li | H04W 72/08 455/450 |
| 9,419,678 B2* | 8/2016 | Vallestad | H04B 1/713 |
| 2017/0050747 A1* | 2/2017 | Wessler | B64D 45/08 |

* cited by examiner

*Primary Examiner* — Sharad Rampuria

(57) ABSTRACT

The disclosed apparatuses and processes utilize multiple threads over multiple paths (towers and/or carriers) in order to improve the above noted problems by dynamically splitting multiple data streams, sending these multiple data streams over multiple data link paths over a cellular network and then combining some or all of the data streams to provide error free availability of relevant data and control while intelligently mitigating bandwidth limitations and "loss of link" or connection, for secure and safe UAS operations. Also described are processes to improve Throughput and/or Reliability of Video data when transmitted over multi-threaded, primarily but not limited to, cellular based communications systems, with a particular emphasis on video used in support of UAS missions.

20 Claims, 14 Drawing Sheets

Normal Packetized Video traversing A SINGLE thread Video system

Normal Packetized Video traversing A Three (3) threaded Video system With NO improvement in Reliability Normal Packetized Video traversing a Three (3) threaded Video system
With 3X improvement in Reliability Normal Packetized Video traversing a Three (3) threaded Video system
APPROXIMATELLY a 6X improvement in Reliability Normal Packetized Video traversing a Three (3) threaded Video system
APPROXIMATELLY a 6X improvement in Reliability
(More Realistic implementation view)

MULTI-THREAD TX/RX AND VIDEO DATA TO IMPROVE THROUGHPUT AND RELIABILITY OVER CELLULAR BASED COMMUNICATIONS SYSTEMS

CROSS-REFERENCE TO RELATED APPLICATIONS

This invention is a Continuation-in-Part of, and claims priority to and the benefit of, U.S. patent application Ser. No. 15/225,496, filed Aug. 1, 2016, and entitled "MULTI-THREAT TX/RX AND VIDEO DATA TO IMPROVE THROUGHPUT AND RELIABILITY OVER CELLULAR BASED COMMUNICATIONS SYSTEMS," which in turn is a Continuation of, and claims priority to, U.S. patent application Ser. No. 15/017,503, filed Feb. 5, 2016, and entitled "MULTI-THREAT TX/RX AND VIDEO DATA TO IMPROVE THROUGHPUT AND RELIABILITY OVER CELLULAR BASED COMMUNICATIONS SYSTEMS," which in turn claims priority to, and the benefit of U.S. Provisional Patent Application Ser. No. 62/112,414, filed Feb. 5, 2015, and entitled "MULTI-THREAD CELLULAR BASED COMMUNICATIONS SYSTEMS." The entire contents of the aforementioned applications are herein expressly incorporated by reference.

FIELD OF THE INVENTION

The invention relates to methods and systems for improving throughput and reliability of control, feedback, and video data transmitted over communication systems, particularly cellular based communications systems used in support of unmanned aerial systems.

DESCRIPTION OF THE BACKGROUND

Modern Unmanned Aerial Systems (UAS) or Unmanned Aerial Vehicles (UAV) typically rely on line-of-sight based wireless communications methods, systems and apparatus. There are currently two general methods of operation: a) remotely piloted by a wireless link, with a control station that provides direct control of the UAS or b) autonomously with directions via GPS and reports back via a live feed through a line-of-sight communications path.

A number of challenges exist in a rapidly growing UAS command, control, and communications area. Most prominent and widely debated issues are associated with the ability for UAS to directly communicate with various ground and air support in the area (regardless to which of the above mentioned UAS architecture they belong), secure downlink bandwidth limitation as more UAS are streaming data at the same time and at a higher throughput, and timely availability of relevant, post-processed data, as well as establishing secure/reliable communications between the ground station and the UAS to mitigate "loss of link" or connection being hacked for devious reasons.

Currently, Users establish a data connection where all data is transmitted/received over a single "thread." This approach cannot provide the communications throughput or reliability required for UAS missions. Satellite based links, are cost prohibitive, fragile, have limited bandwidth and limited time interval in the case of those not in geostationary orbits. In addition, militaries and technology firms worldwide are focused on: the ability to do as much autonomous on board processing as possible and to reduce the volume of data exchanged between the UAV and ground station. The result is a reduction in the degree of real-time operator intervention via the control station. Further, Advanced UAS sensor payloads are acquiring a wealth of data, including full-motion video (FMV) and high-definition (HD) images. Bandwidth is often limited, and can prevent the transmission, sharing, and display of mission-critical information. Such network limitations are driving the need for efficient and secure data processing, as well as a robust and reliable UAS command, control and communications system that intelligently integrate safety and security.

Thus, a need exists for an improved process for a robust and stable command, control and communications system with an emphasis on UAS missions that improves throughput and reliability.

Advanced UAS sensor payloads are acquiring a wealth of data, including full-motion video (FMV) and high-definition (HD) images. Bandwidth is often limited, and can prevent the transmission, sharing, and display of mission-critical information. Such network limitations are driving the need for efficient and secure data processing, as well as a robust and stable UAS command, control and communications system that intelligently integrate safety and security.

Thus, a need exists for improved processes, methods and devices for a robust and stable UAS command, control and communications system that intelligently integrate safety, security, and autonomy.

SUMMARY OF THE INVENTION

According to one embodiment of the invention, a process utilizes multiple threads over multiple paths (towers and/or carriers) in order to improve the above noted problems by dynamically splitting multiple data streams, sending these multiple data streams over multiple data link paths over a cellular network and then combining some or all of the data streams to provide error free availability of relevant data and control while intelligently mitigating bandwidth limitations and "loss of link" or connection, for secure and safe UAS operations. According to a second embodiment of the invention, the inherent relative importance of some packets of video data over other packets of video data from the same source is used to prioritize packet delivery; however the process is not limited to video stream with varying degrees of importance between the frames. According to a third embodiment, the processes of both the first and second embodiments are used to send data over a cellular network.

DETAILED DESCRIPTION OF THE INVENTION

As used herein the term Unmanned Aerial System (UAS) emphasizes the importance of other elements beyond an aircraft itself An Unmanned Aerial System (UAS) is defined as one that consists of the following subsystems and equipment: unmanned aircraft, control data links, control station (ground, ship, or air-based), support equipment, flight termination systems, launch/recovery equipment, and operator (or Pilot-in-Command). As used herein the term "throughput" refers to network throughput which is the rate of successful message delivery over a communication channel. Throughput is usually measured in bits per second (bit/s or bps), and sometimes in data packets per second or data packets per time slot.

According to a first embodiment of the invention, a process for improving throughput and reliability over cellular based communication systems, particularly for use with unmanned aerial systems, the process includes three (3) components and taking advantage of the fact that data communications is packet based. The first (1) component is by opening multiple same carrier connections the user can increase throughput, although improvements in reliability are limited. The second (2) component is by opening multiple threads over multiple carriers whereby the user can increase throughput and/or reliability over (1) alone. The third (3) component is utilizing altitude to establish connections to extra towers that are now available to establish additional connections (threads).

Figure 1:
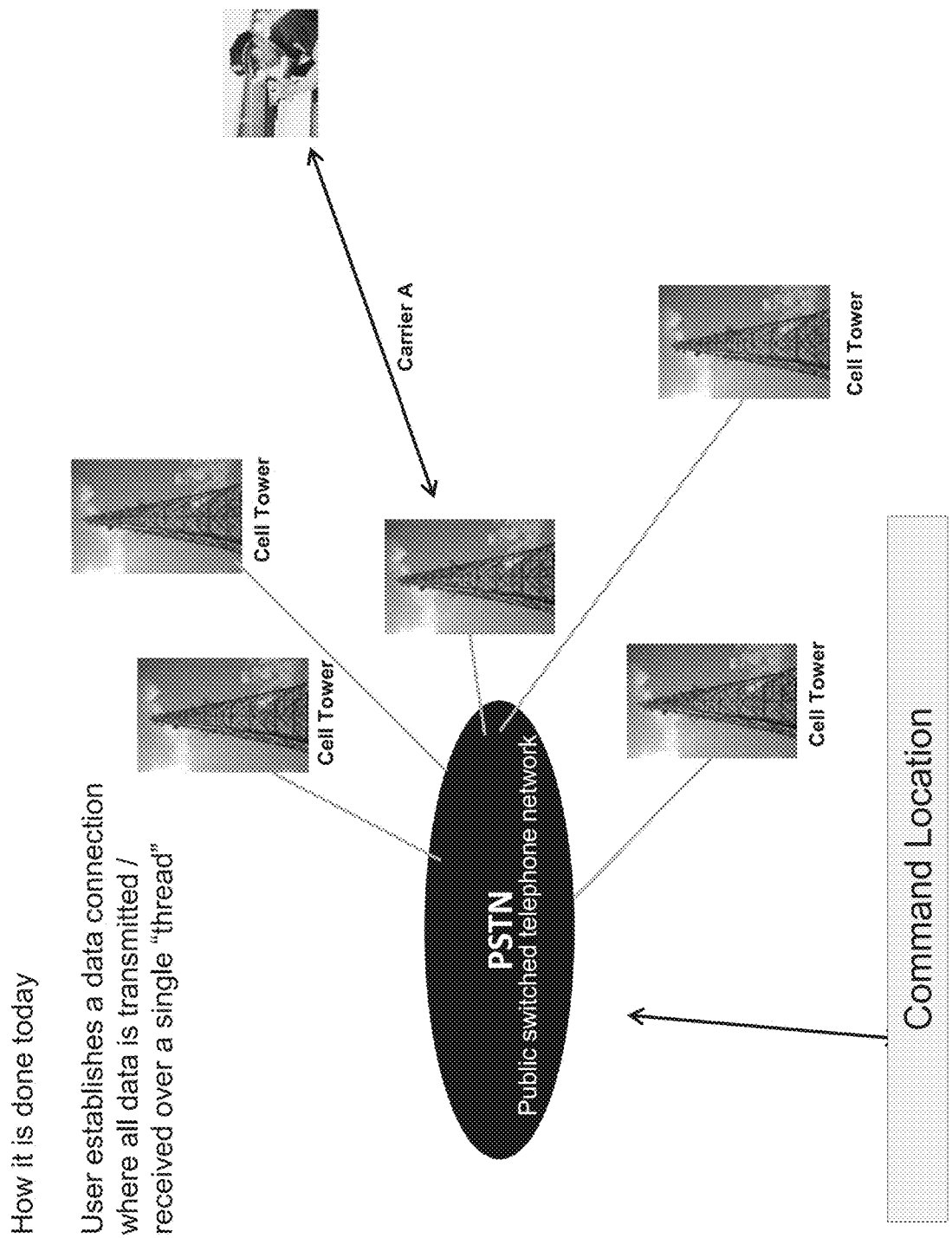
FIG. 1 is a block diagram illustrating how a user establishes a data connection where all data is transmitted/received over a single "thread.

FIG. 1 illustrates how data connections are previously/currently utilized. A first responder executes a cellular connection to the command center through a single "thread" or Carrier A and then switched via the Public Switched telephone Network.

Figure 2:
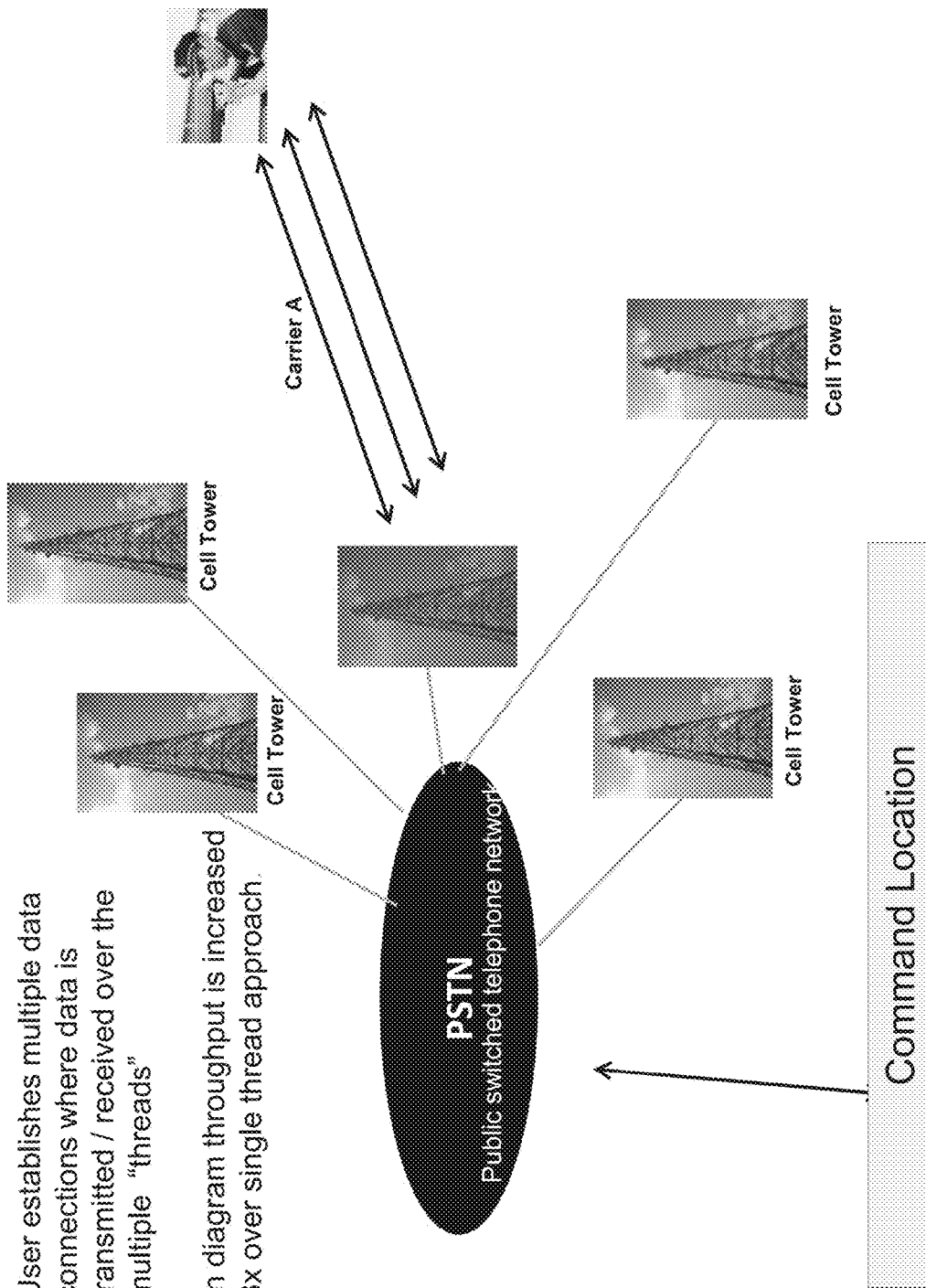
FIG. 2 is a block diagram illustrating how a user establishes multiple data connections where data is transmitted/received over the multiple "threads". According to the embodiment shown in this diagram, throughput is increased 3× over single thread approach

FIG. 2 illustrates the process and advantages of utilizing multiple "threads." By opening multiple same carrier connections the user can increase throughput, although improvements in reliability are limited. In FIG. 2, the user/first responder throughput can increase, basically, by 3× (FIG. 1 vs. FIG. 2) due to three threads vs. one. Reliability isn't increased substantially because it is likely that any errors on one thread will also occur on the other two threads. NOTE: three threads are drawn for simplicity of diagram and explanation. There is no limit with respect to the process of how many threads are utilized and the limit is defined by the number of connections the cellular provider will allow or technically support.

Figure 3:
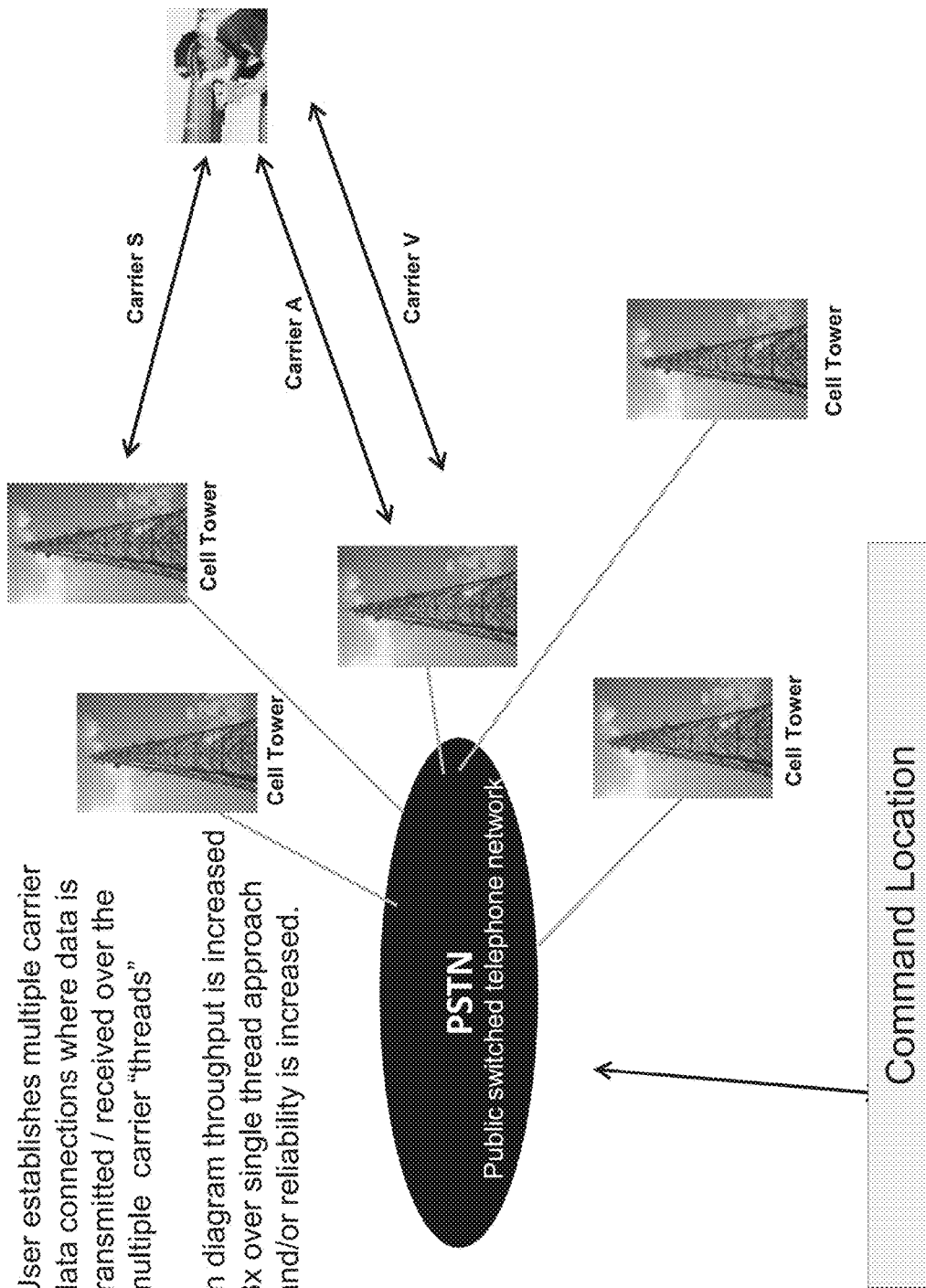
FIG. 3 is a block diagram illustrating an exemplary embodiment of increased throughput and reliability where User establishes multiple carrier data connections where data is transmitted/received over the multiple carrier "threads." According to the embodiment shown in this diagram, throughput is increased 3× over single thread approach and/or reliability is increased.

FIG. 3 illustrates the process and advantages of multiple threads over multiple carriers whereby the user can increase throughput and/or reliability over #1 alone. Like #1 the user can achieve the same 3× throughput improvements OR the user can now choose to tradeoff some of the throughput and improve reliability. For example, if maximum reliability improvement is desired the user data can be sent over all three paths concurrently. This would result in no throughput improvement but since each data packet is being sent three (3) times—once over each carrier path—any disruption of any one carrier would be compensated for by the data traversing an alternate path. OR the user can now choose a mix of throughput and reliability improvements; throughput and reliability can be traded. For example, each packet could be replicated 2× and transmitted over two separate paths and throughput could be increased 2× as well.

Figure 4:
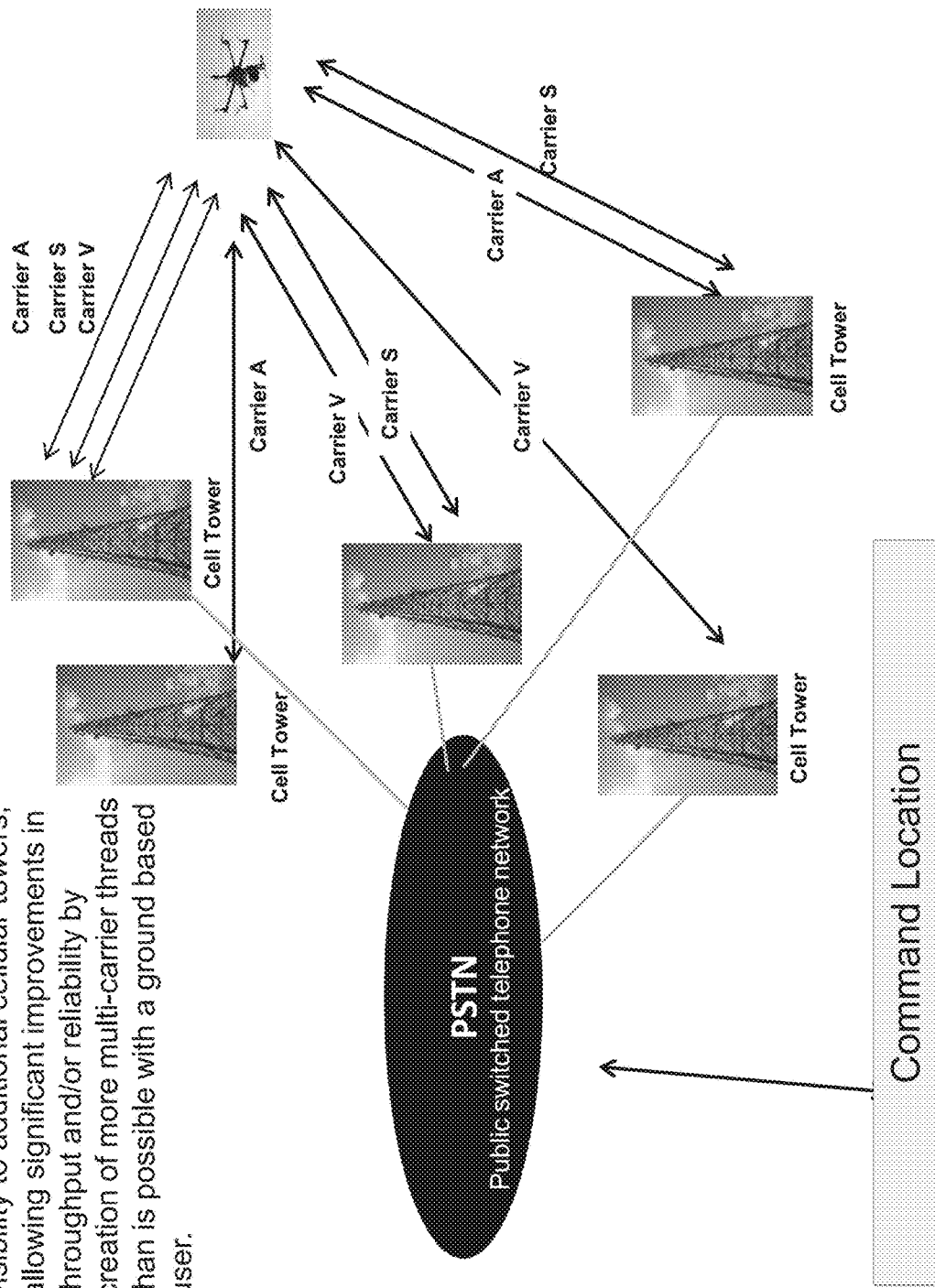
FIG. 4 is a block diagram illustrating an exemplary embodiment whereby the elevated UAS has visibility to additional cellular towers, allowing significant improvements in throughput and/or reliability by creation of more multi-carrier threads than is possible with a ground based user.

FIG. 4 illustrates the process and advantages of altitude and multi-carrier threads. When using cellular data connectivity from ground level, there is typically a very limited number of cellular phone towers which can be utilized to establish network data connectivity. However, when elevated 100', 200', 500', 1000' the number of cellular towers within line-of-sight increases drastically. This process uses the extra towers that are now available to establish additional connections (threads). For example, at ground level a user can typically establish a connection with a limited number of cellular data towers (FIGS. 2,3). As altitude increases the number of towers visible increases drastically. By establishing multiple threads consisting of multiple carriers across multiple towers both throughput and/or reliability improve.

Figure 5:
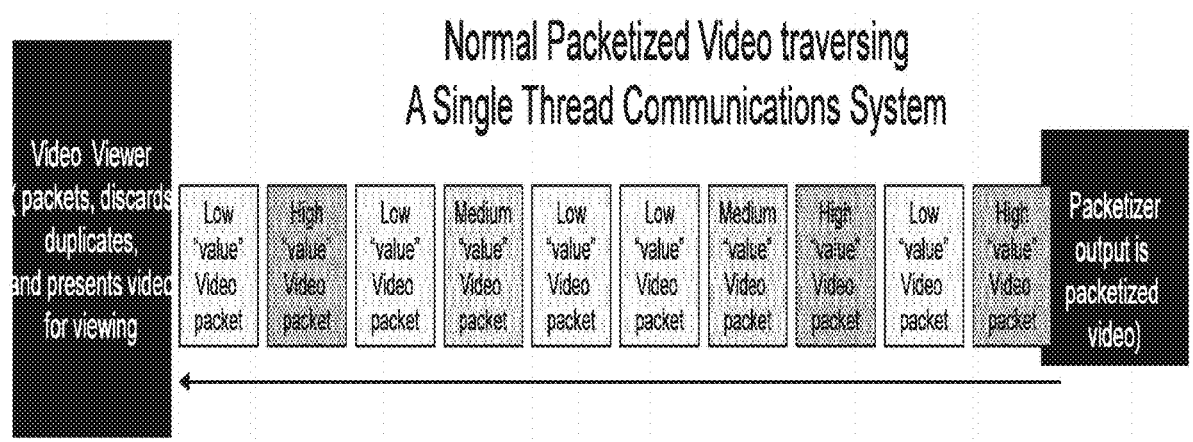
FIG. 5 Is a block diagram illustrating a Normal Packetized Video traversing a single thread Video system.

FIG. 5 is a block diagram illustrating an exemplary embodiment of a Normal Packetized Video traversing A SINGLE thread Video system. In this diagram as in diagrams which follow—for simplicity only-one "frame" of video is diagramed as being carried in one packet of data. This is NOT normally the case nor is it required, but the process is most easily explained if this simplifying assumption is utilized.

Figure 6:
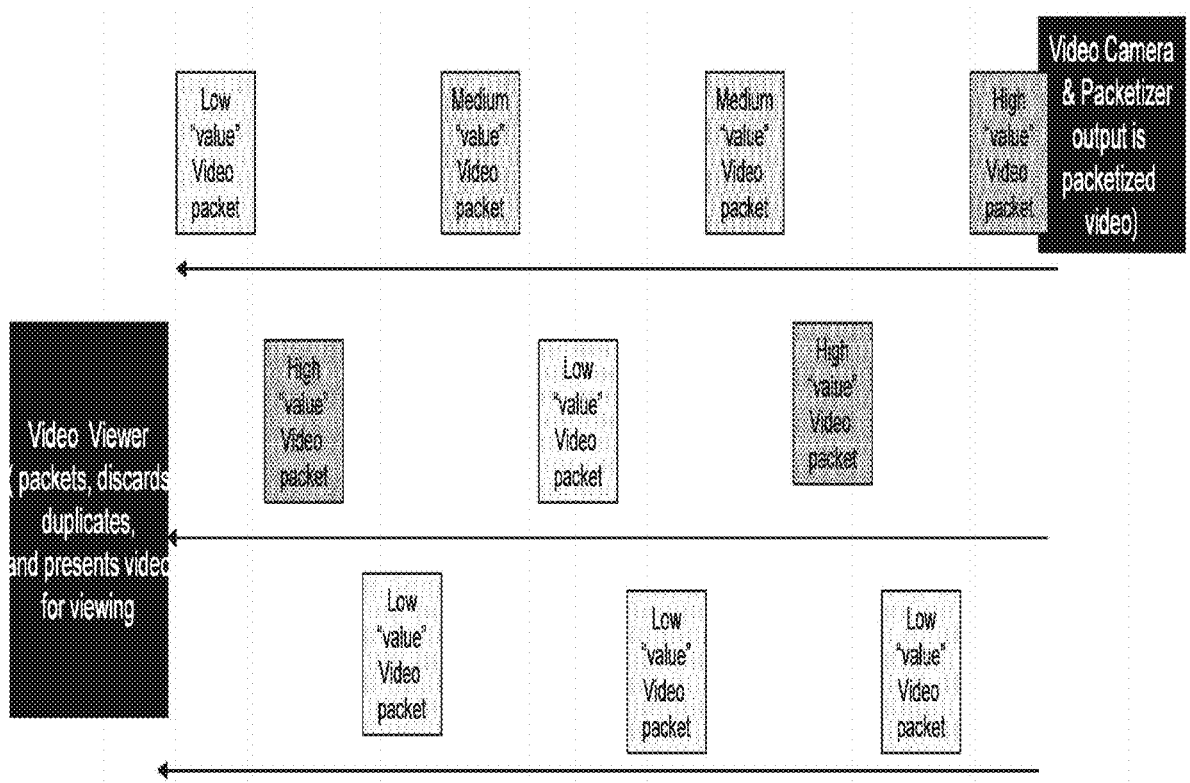
FIG. 6 is a block diagram illustrating an exemplary embodiment of a Normal Packetized Video traversing A Three (3) threaded Video system with no improvement in Reliability.

FIG. 6 is a block diagram illustrating an exemplary embodiment of a Normal Packetized Video traversing A Three (3) threaded Video system with NO improvement in Reliability. (Demonstration only—there is no real value in implementing this solution vs. a Single Thread solution (FIG I). In this example the Video Viewer receives the exact packets as it did in the Single Thread solution with the only difference is it receives the packets on 1 of 3 threads (network paths). NOTE: The process is NOT limited to three (3) threads, the number of threads is limited only by the available communication paths. Three (3) is shown for simplicity of understanding.

Figure 7:
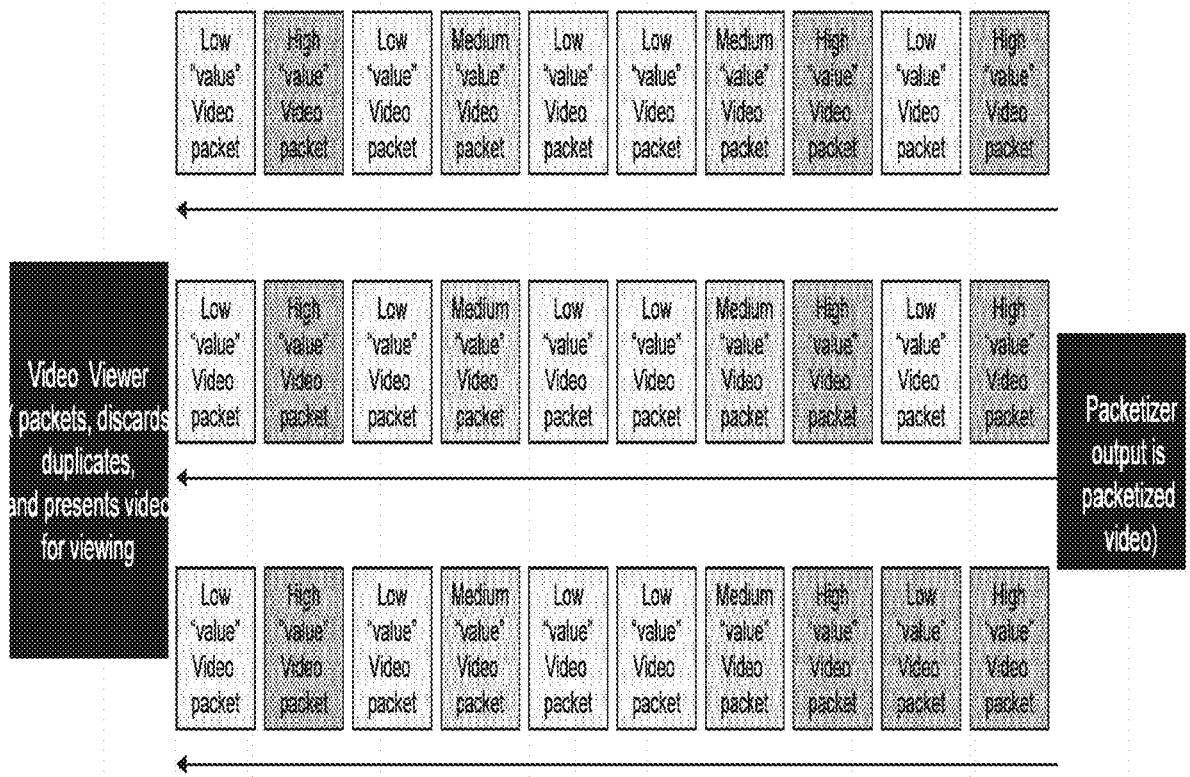
FIG. 7 is a block diagram illustrating an exemplary embodiment of Normal Packetized Video traversing a Three (3) threaded Video system with 3X improvement in Reliability.

FIG. 7 is a block diagram illustrating an exemplary embodiment of Normal Packetized Video traversing a Three (3) threaded Video system with 3× improvement in Reliability. In this diagram, the Video Viewer receives, assuming perfect communications, the three (3) copies of the exact packets as it did in Single Thread solution (Fig I). The advantage is that if the communication path is not perfect, the video viewer has three (3) opportunities to receive the packet and recreate the original video stream. Hence, the user of the system is more likely to receive perfect video even if the underlying communications paths drop up to ⅓ of their packets. NOTE: The process is NOT limited to three (3) threads, the number of threads is limited only by the available communication paths. Three (3) is shown for simplicity of understanding.

Figure 8:
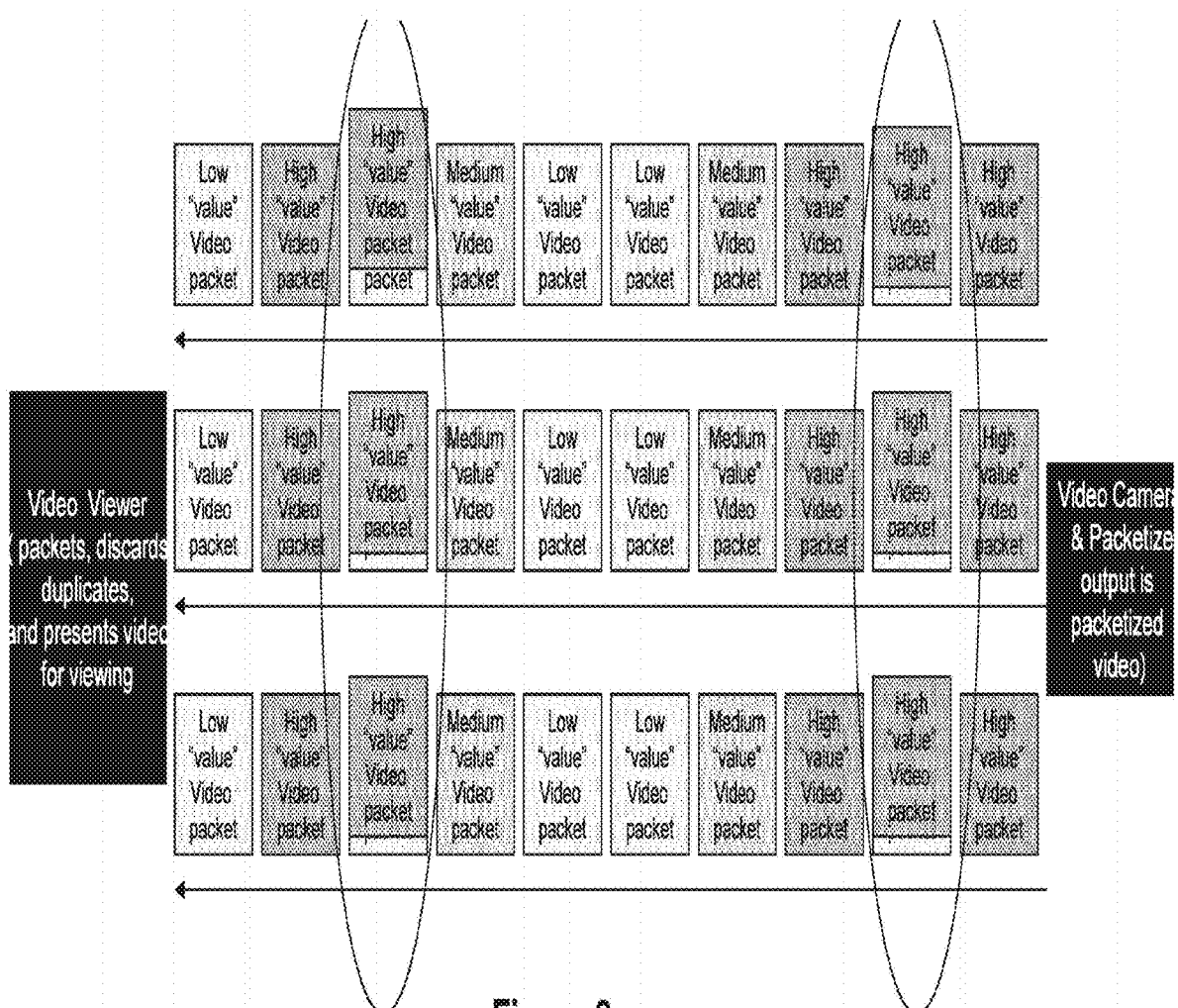
FIG. 8 is a block diagram illustrating an exemplary embodiment of Normal Packetized Video traversing a Three (3) threaded Video system with approximately a 6× improvement in Reliability.

FIG. 8 is a block diagram illustrating an exemplary embodiment of Normal Packetized Video traversing a Three (3) threaded Video system with approximately a 6× improvement in Reliability. In this example, the Video Viewer receives, assuming perfect communications, the three (3) copies of the packets as it did in Single Thread solution (FIG. 1) EXCEPT that a small % (in this example 6 packets) of low value video packets have been replaced in each of the threads by DUPLICATE value video packets. The advantage is that if the communication path is not perfect, the video viewer has additional opportunities to receive the high value video packets at the expense of receiving less low value video packets. Since high value video packets are more important in creating the original video view than low priority packets the end user is approximately 6× more likely to have a video view close to the original video sequence, at the "cost" of somewhat reduced frame-rate type effects on the viewed video. For video transmission over high loss paths trading low value video frames for high value frames can make good sense. NOTE: The process is NOT limited to three (3) threads, the number of threads is limited only by the available communication paths. Three (3) is shown for simplicity of understanding. Also, the process does not require all of the "replaced" packets to align as they do in the diagram. Normally the "replaced" duplicate packets are randomly assigned throughout the threads to further improve reliability; however for simplification of illustration they are aligned.

Figure 9:
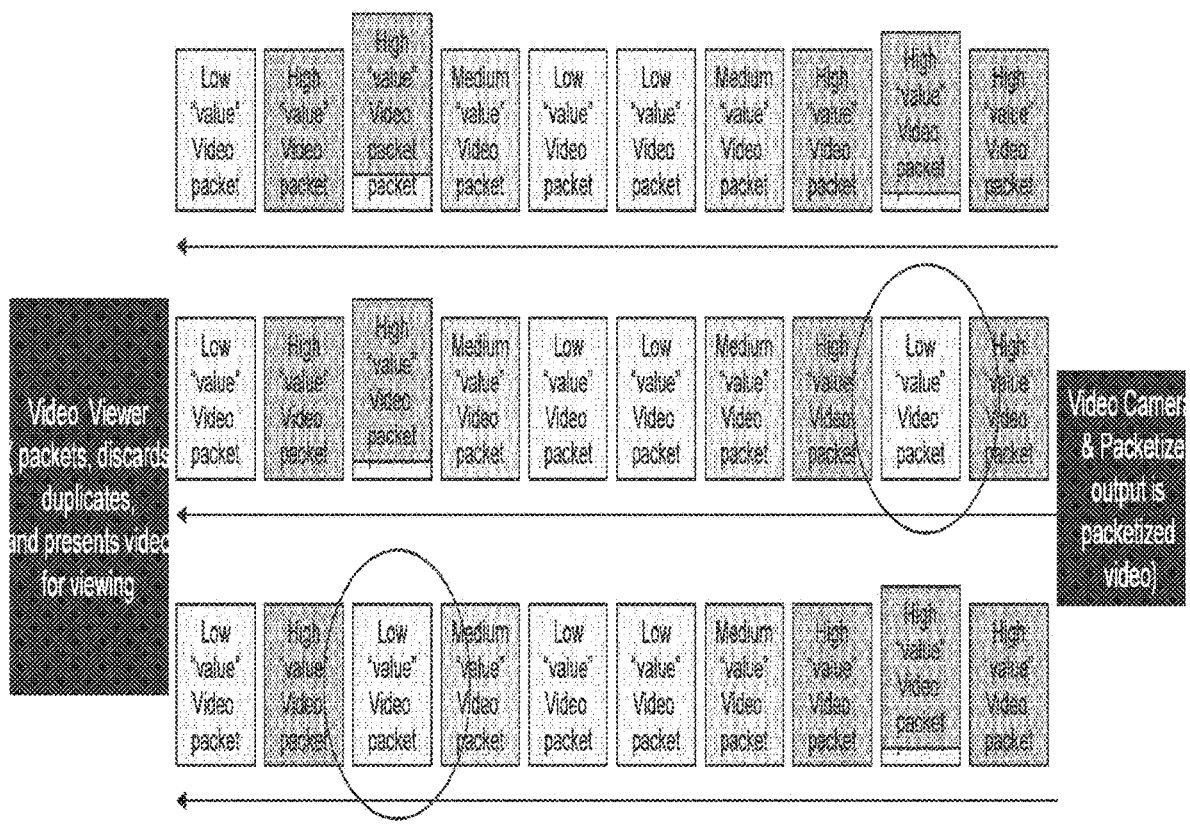
FIG. 9 is a block diagram of an exemplary embodiment of Normal Packetized Video traversing a Three (3) threaded Video system with approximately a 6× improvement in Reliability and a more realistic implementation view.

FIG. 9 is a block diagram of an exemplary embodiment of Normal Packetized Video traversing a Three (3) threaded Video system with approximately a 6× improvement in Reliability and a more realistic implementation view. Similarly to FIG. 4, the Video Viewer receives, assuming perfect communications, the three (3) copies of the packets as it did in Single Thread solution (Fig I) EXCEPT that a small 1% (in this example 6 packets) of low value video packets have been replaced in each of the threads by DUPLICATE high value video packets. The difference between FIG. 4 and FIG. 5 is that not 1 00% of any low value video packet is replaced with high value packets. In FIG. 4, some of the low value video packets had no opportunity to traverse the multi-threaded communication paths because they were replaced at the source (video camera) with high value packets. In this example some (tunable depending on the measured or anticipated reliability of the communication paths) of the low value packets are replaced with high value packets but at least every low value packet is transmitted on at least one of the communication paths. The advantage is that if the communication path is not perfect, the video viewer has additional opportunities to receive the high value video packets at the expense of receiving less low value video packets. Since high value video packets are more important in creating the original video view than low priority packets the end user is approximately 6× more likely to have a video view close to the original video sequence, at the "cost" of somewhat reduced frame-rate type effects on the viewed video. Unlike FIG. 4 in this example, if the communications path is perfect the end viewer will have the exact same viewing experience as in FIG. 1. Additionally if the communications path is less than perfect the probability of the end user have a viewing experience near perfect is significantly greater than would be possible with any other option except FIG. 4. For video transmission over high loss paths trading low value video frames for high value frames can make good sense.

NOTE: The process is NOT limited to three (3) threads, the number of threads is limited only by the available communication paths. Three (3) is shown for simplicity of understanding. Also, the "duplication" of high value packets and the subsequent placing of these high value packets into the data streams is NOT limited to duplication.

The process holds if the high value packets are repeated 3×, 4×, 5×, 10×, 100×, etc. Duplication is shown in the FIG. 5 for illustrative purposes only. In addition, the examples deal with replacing low value packets with high value packets. In reality, some % of high value and, most often, a lower percent of medium value packets would be replicated and replace low value packets. Furthermore, the examples suggest video streams have three (3) values of packets. This is for illustrative purposes only. Some type of video have two value (e.g. high and low), other video types have significantly more than two (2) or three (3). The process is not limited to three classes of video packets, this is illustrative only. Some video streams are such that all frames of video are equal in importance. In this case the replication of some frames is done to allow at least a lower frame rate reconstruction at the viewer should network loss require it. The examples show three threads. Nothing in the process limits the number of threads to three (3). Three is used for illustrative purposes only. Often 2, 3, 4, 10, 100 threads are utilized. The process remains the same without concern for the number of threads. While FIG. 5 shows what could be considered point-to-point threads from video source to video viewer, in practice the threads are nearly always a complex set of links. This concept is particularly useful in the case of a cellular based network where multiple threads can be achieved using a mix of cellular carriers over multiple cell towers.

This process works on Closed and Open loop systems. In the simplified illustrations the number of frames duplicated and replaced is for simplicity of viewing. In actual systems statistical probability of loss of data over the communication paths dictates the amount of replication and insertion of packets. For example, in a system where packet (i.e. frame in our simplified case) loss is measured or anticipated to be 50% one would want to at least replicate the important frames 2×, likely 3× or 4× to if loss of any video is considered high priority (i.e. teleoperation of a vehicle). In OPEN loop systems the operator must use pre-existing data to assess the amount of replication and replacement required. In CLOSED loop system the system can measure the amount of loss occurring and dynamically have the sending unit increase the replication and replacement— likely by reducing other factors such as resolution and/or frame-rate—such that the network pipe is fully utilized but not put into a state of congestion. FIGS. 10-13 describe some embodiments of a Closed Loop Control system (CLCS) configured to carryout closed loop management of communication of data.

Figure 10:
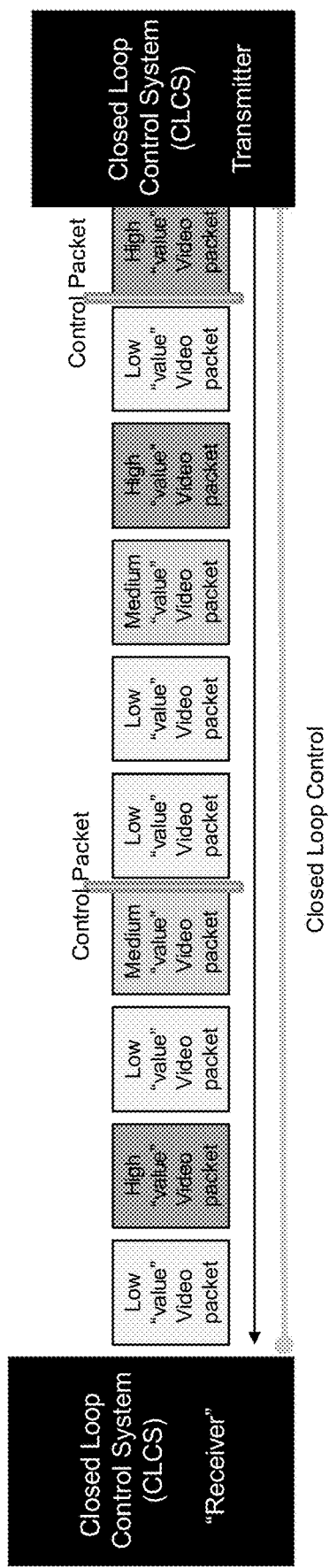
FIG. 10 is a block diagram of normal packetized video traversing a single threaded video system using a closed loop control system (CLCS) according to an embodiment.

FIG. 10 illustrates normal packetized video traversing a single threaded video system using a closed loop control system (CLCS) according to an embodiment. In this illustration, for the sake of simplicity of illustration, one "frame" of video is diagramed as being carried in one packet of data. This may not be normally the case nor is it required. With closed loop control added to the diagram, a single thread is used to illustrate a starting position. Closed loop control can use a hardware and/or hardware/software solution at either end of the path to coordinate; denoted in the diagram as a "Closed Loop Control System Receiver" and "Closed Loop Control System Transmitter". The algorithm implementing the closed loop control, for example an algorithm implemented by a software within the CLCS receiver and/or CLCS transmitter, may not specify any hardware or software approaches other the requirement that the hardware only solution or hardware/software solution meet the requirements of the closed loop algorithm. The Closed Loop Control System(s) at either or both ends of the link can serve additional purposes, such as providing a network switch function or the like. These extra functions, which could be performed can be unrelated to the Closed Loop algorithm, can be considered ancillary functions.

An example of Control Packets is diagrammed in FIG. 10. The number of unique Control Packets is defined by the throughput and reliability desired by the system and by the amount of "control" that can be injected into the user traffic. The algorithm has the ability to tune, in real-time, the amount of "control" that is used to enable effective sampling of the communications paths. Additionally user data often has the ability to have sections of the IP Packet header be used for specific purposes or can be used for specific purposes without impacting the transmission of the user data itself. The Algorithm can use sections of the IP packet headers in place of or in conjunction with independent Control Packets for closed loop control as the user data allows. Hence the Closed Loop Control Algorithm can use: 1) Independent Control Packets, 2) Control data inserted into the user data headers, and 3) a combination of both to adjust the system in real-time to maximize throughput and/or reliability based on user data requirements as defined within each user data flow, typically by the setting of Differenced Service Code Points (DCSP) but other methods of exchanging user requirements can also be supported. Notably, while video is used to illustrate the algorithm in the examples in FIGS. 10-13, the system is not limited to video and can support audio as well as all other types of data. Additionally, while in the examples in FIGS. 10-13 it appears that all network traffic is shown to flow in one direction; as diagrammed from the "Transmitter" to the "Receiver", this is for illustrative purposes only. In other embodiments of systems traffic can be bi-directional and both ends of the link can each include both a Transmitter and/or a Receiver.

Figure 11:
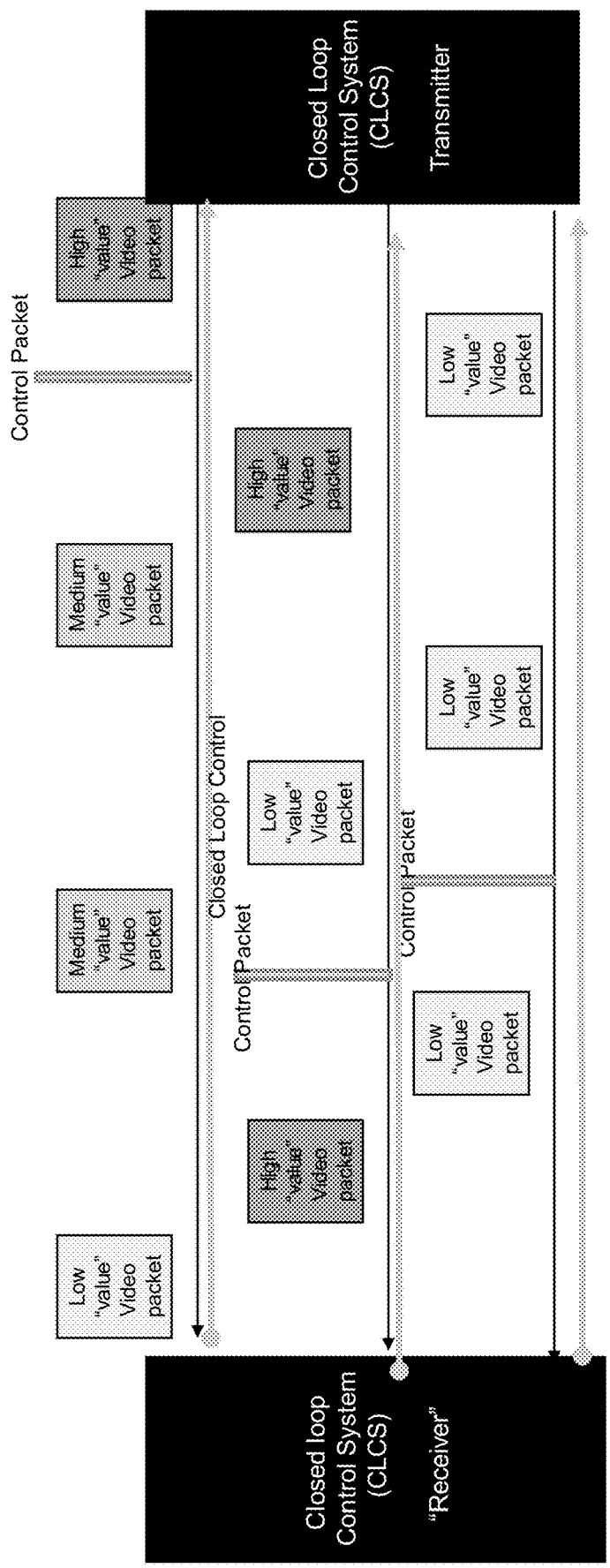
FIG. 11 is a block diagram of normal packetized video traversing a three threaded video system using a closed loop control system (CLCS) according to an embodiment.

FIG. 11 illustrates an example normal packetized video traversing a three threaded video system using a closed loop control system (CLCS) according to an embodiment. In this illustrated example there may be no improvement in reliability in some instances. In this illustration, as described for FIG. 10, for the sake of simplicity of illustration, one "frame" of video is diagramed as being carried in one packet of data. This may not be normally the case nor is it required.

In this example the Closed Loop Control System (CLCS) Receiver receives the exact packets as it did in single thread solution referenced in FIG. 10 except that the CLCS Receiver receives the packets on 1 of 3 threads (network paths). In this example, the CLCS Receiver would pass all the user data packets to the user systems. Additionally, the CLCS Receiver would receive the Control Packets injected onto the network (injected independently as diagrammed and/or as part of the headers for the user data as described earlier) and use the Control Packets to inform the CLCS Transmitter of the reliability of the three (3) communications paths. The CLCS Transmitter uses this information to increase or decrease the replication of higher priority packets; trading throughput for reliability. It should be noted that the process is not limited to three (3) threads. The number of threads may be determined by the available communication paths. Three (3) is shown for simplicity of illustration and understanding.

Figure 12:
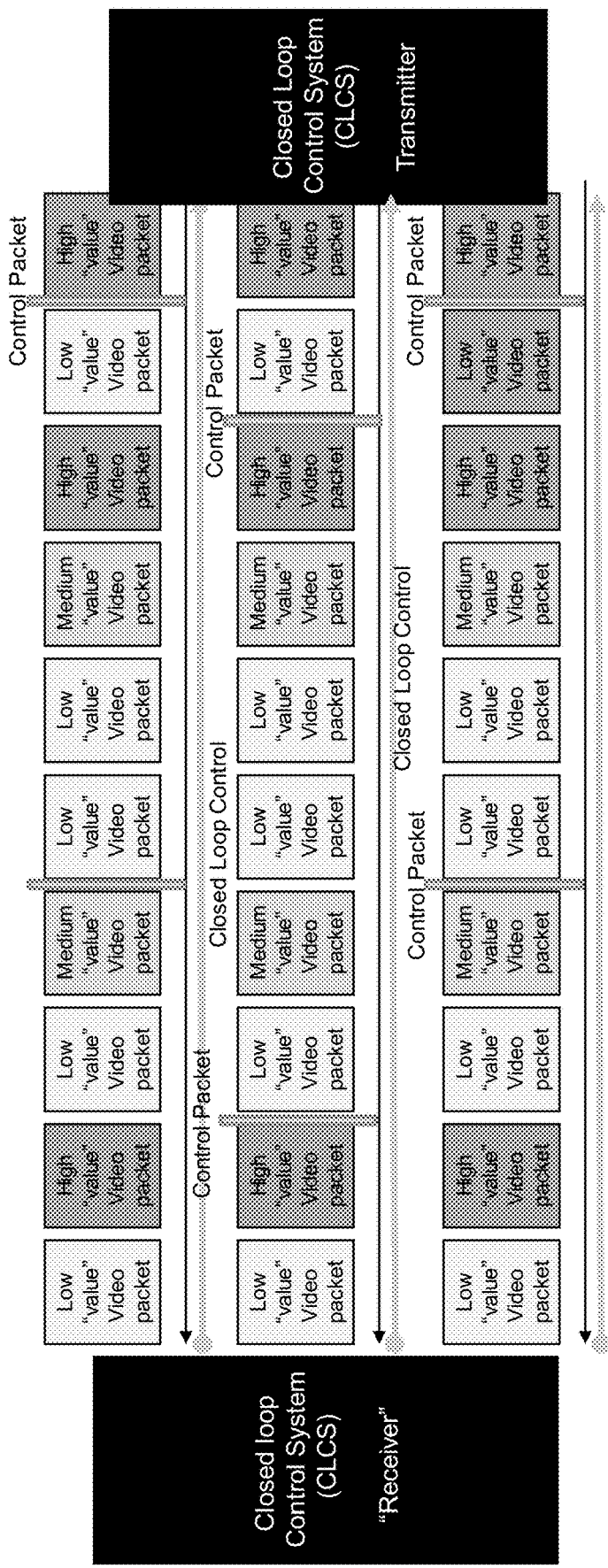
FIG. 12 is a block diagram of normal packetized video traversing a three threaded video system with 3× improvement in reliability using a closed loop control system (CLCS) according to an embodiment.

FIG. 12 illustrates an example normal packetized video traversing a three threaded video system with 3× improvement in reliability, using a closed loop control system (CLCS), according to an embodiment. In this illustration, as described for FIGS. 10 and 11, for the sake of simplicity of illustration, one "frame" of video is diagramed as being carried in one packet of data. This may not be normally the case nor is it required. In this example the CLCS Receiver receives, assuming perfect communications, the three (3) copies of the exact packets as it did in single thread solution (with reference to FIG. 10). The CLCS Receiver would forward these video packets to the video viewer (not shown). Additionally the CLCS Receiver receives the Control Packets and like the prior example, described with reference to FIG. 12, uses this information to adjust the system.

In this example the communication path is assumed perfect and all packets are repeated multiple times. This simple replication of packets trades throughput for reliability. For example, if the Communications system is not perfect, the video viewer has three (3) opportunities to receive the packet and recreate the original video stream. Hence the user of the system is more likely to receive perfect video even if the underlying communications paths drop up to ⅓ of their packets. The trade-off is that if the underlying communications paths are perfect then the system is operating at 33% efficiency in terms of overall throughput. It should be noted that the process described in FIG. 12 is not limited to three (3) threads. In some instances, the number of threads can be determined or limited by the available communication paths. In the illustration in FIG. 12, three (3) threads are shown for simplicity of understanding.

Figure 13:
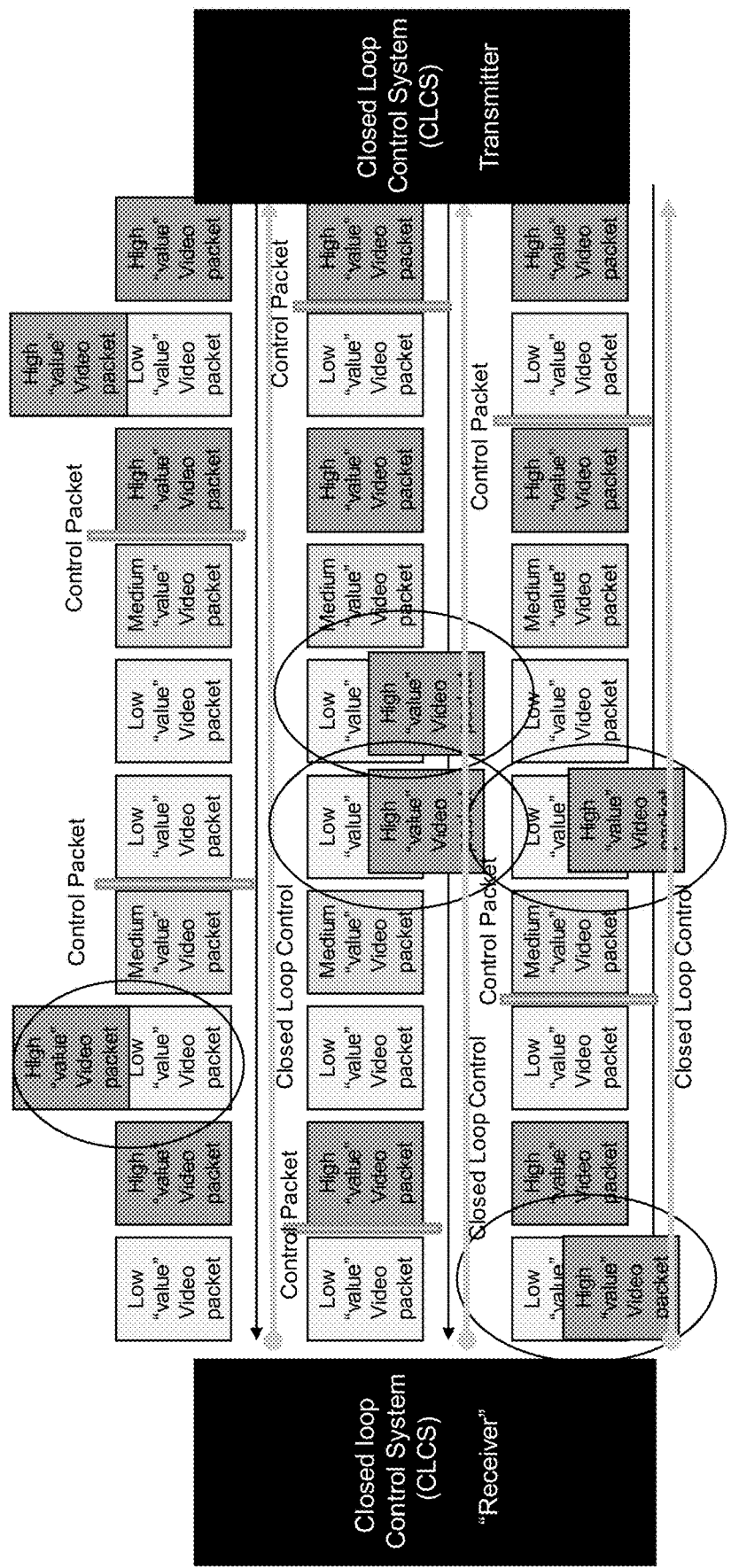
FIG. 13 is a block diagram of normal packetized video traversing a three threaded video system with approximately 6× improvement in reliability and/or a 3× improvement in throughput using a closed loop control system (CLCS) according to an embodiment.

FIG. 13 illustrates an example normal packetized video traversing a three threaded video system with approximately a 6× improvement in reliability and/or a 3× improvement in throughput (over a single thread), using a closed loop control system (CLCS), according to an embodiment. The improvement in reliability and the improvement in throughput can be dynamically traded over time as conditions of each channel change. In this illustration, as described for FIGS. 10-12, for the sake of simplicity of illustration, one "frame" of video is diagramed as being carried in one packet of data. This may not be normally the case nor is it required.

In this example the video viewer receives, assuming perfect communications, the three (3) copies of the packets as it did in single thread solution (referenced in FIG. 10), except that a small percentage (in this example 6 packets) of low value video packets have been replaced in each of the threads by duplicate high value video packets. The advantage can be that if the communication path is not perfect, the video viewer has additional opportunities to receive the high value video packets at the expense of receiving less low value video packets. Since high value video packets are more important in creating (or defining) the original video view than low priority packets, the end user is approximately 6× more likely to have a video view close to the original video sequence, at the "cost" of somewhat reduced framerate type effects on the viewed video. For video transmission over high loss paths trading low value video frames for high value frames can be optimal. It should be noted that the process is not limited to three (3) threads. In some instances, the number of threads can be determined or limited only by the available communication paths. Three (3) threads are shown for simplicity of understanding. It should also be noted that the process does not require all of the "replaced" packets to align as they do in the example illustrated in FIG. 13. In some instances, the "replaced" duplicate packets can be randomly assigned throughout the threads to further improve reliability; however for simplification of illustration they are shown to be aligned.

Figure 14:
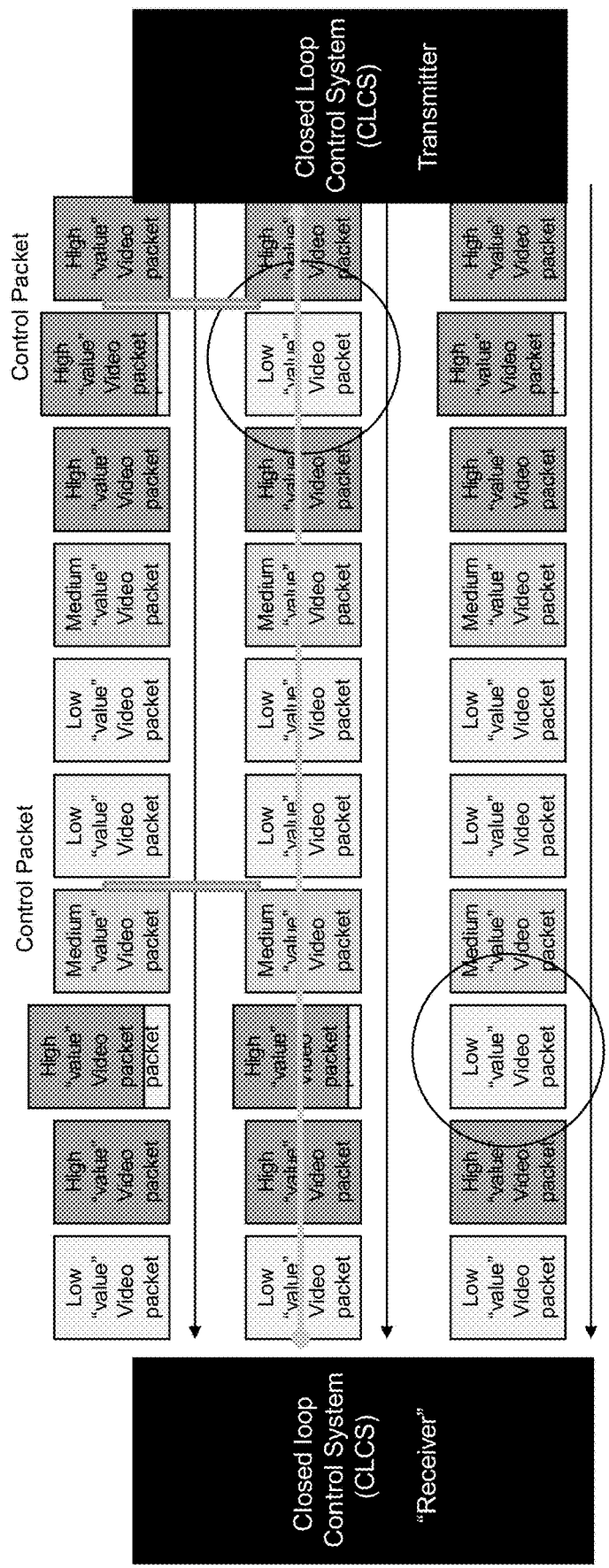
FIG. 14 is a block diagram of normal packetized video traversing a three threaded video system with approximately 6× improvement in reliability, using a closed loop control system (CLCS), according to an embodiment.

FIG. 14 illustrates an example normal packetized video traversing a three threaded video system with approximately a 6× improvement in reliability, using a closed loop control system (CLCS), according to an embodiment. In this illustration, as described for FIGS. 10-13, for the sake of simplicity of illustration, one "frame" of video is diagramed as being carried in one packet of data. This may not be normally the case nor is it required.

In this example the CLCS Receiver receives, assuming perfect communications and the Closed Loop algorithm configured for maximum reliability, the three (3) copies of the packets as it did in single thread solution (referenced in FIG. 10), except that a small percentage (in this example 6 packets) of low value video packets have been replaced in each of the threads by duplicate high value video packets. In this case in each of the circles in the example the Low Priority Packet is replaced with the High Priority packet. However, the inclusion of the Closed Loop algorithm would allow the Closed Loop Control System to detect that all three network paths are "reliable" (meeting the user requirements for the 1 or more types of data being injected into the network). Using this information the Closed Loop Control System could choose to reduce the level of duplication of packets and instead increase the overall system throughput.

For example, in some instances when the CLCS detects the need for maximum reliability, a single video stream could be duplicated over all three communications paths. However, when no reliability is required, the CLCS could choose to send three unique video streams simultaneously. In some instances, the mix of traffic can be much more complex and the CLCS can be configured to be constantly trading replicating packets to improve reliability and reducing replication to improve throughput; all based on user defined parameters for each data flow being injected into the network. In some implementations, Differentiated Service Code Points (DSCP) or other user specified means are used to alert the CLCS as to the reliability requirements for each data flow being injected.

In the example illustrated in FIG. 14, the CLCS either sends each packet 3 times (maximum reliability) or sends 3 times the number of packets (maximum throughput). In some instances this can be a binary situation. For example, based on user data requirements, some packets can be replicated, while some are not. Some user threads may call for more reliability and some user threads may call for more throughput at the trade-off of reliability. The CLCS algorithm can be configured to be constantly using Control Packet data and adjusting to more effectively utilize the communications channels available.

It should be noted that the process outlined in FIG. 14 is not limited to three (3) threads; the number of threads is a function of the available communication paths. Three (3) threads are shown for simplicity of understanding. Also, the "duplication" of high value packets and the subsequent placing of these high value packets into the data streams is not limited to duplication to 2× times. The process holds if the high value packets are repeated 3λ, 4λ, 5λ, 10λ, 100λ, etc. Duplication is show in the figure for illustrative purposes only. The examples in FIGS. 13 and 14 illustrate replacing low value packets with high value packets. In some implementations both some percent of high value and, a lower percent of medium value packets can be replicated and replace low value packets. The examples illustrated in FIGS. 10-13 suggest video streams have three (3) values of packets. This is shown for illustrative purposes only. Some types of video can have two values (e.g. high and low), while some other video types can have significantly more than two (2) or three (3) or higher integer values. The process is not limited to three classes of video packets; this is illustrative only. In some instances, some video streams can be such that all frames of video are equal in importance. In such cases the replication of some frames can be done to allow at least a lower frame rate reconstruction at the viewer should network loss require. As described previously, the examples in FIGS. 11-14 show three threads. Nothing in the process limits the number of threads to three (3). Three threads are used for illustrative purposes only. For example, in some implementations, 2, 3, 4, 10, 100 or any other integer value of number of threads can be utilized. The process essentially remains the same without concern for the number of threads. While the examples in FIGS. 10-14 show what could be considered point-to-point threads from video source into a CLCS Transmitter to CLCS Receiver and then to a video viewer, in some implementations the threads can nearly always be a complex set of links. This concept is particularly useful in the case of a cellular-based network where multiple threads can be achieved using a mix of cellular carriers over multiple cell towers. The above described processes, with reference to FIGS. 10-14, can be implemented on Closed and Open loop systems. The examples illustrated describe the processes using a closed loop system for illustration purposes alone.

In the simplified illustrations in FIGS. 10-14 the number of frames duplicated and replaced is shown for simplicity of viewing. In other systems, statistical probability of loss of data over the communication paths as determined by the Control Packets can be used to determine the amount of replication and insertion of packets. For example, in a system where packet (i.e., frame in our simplified case) loss is measured or anticipated to be 50%, a user may want to at least replicate the important frames 2×, likely 3× or 4× too, if loss of any video is considered high priority (i.e., teleoperation of a vehicle). In Open loop systems, the operator uses pre-existing data to assess the amount of replication and replacement required. In Closed loop system, the system can measure the amount of loss occurring and dynamically have the sending unit increase the replication and replacement—for example, by reducing other factors such as resolution and/or frame-rate—such that the network pipe is fully utilized but not put into a state of congestion. As described previously, the number of unique Control Packets can be defined by the throughput and reliability desired by the system and by the amount of "control" that can be injected into the user traffic.

According to a further embodiment, the embodiments described in FIGS. 2-4 and the accompanying description, is used in conjunction with the embodiment of FIGS. 6-14 and the accompanying description. While various embodiments have been described above, it should be understood that they have been presented by way of example only, and not limitation. Where process and/or schematics described above indicate certain events and/or flow patterns occurring in certain order, the ordering of certain events and/or flow patterns may be modified. While the embodiments have been particularly shown and described, it will be understood that various changes in form and details may be made.

The invention claimed is:

1. An apparatus, comprising:
a wireless-enabled device, in a network entity at an above-ground altitude, configured to be included in a plurality of data connections with a plurality of network devices, each data connection from the plurality of data connections being associated with a carrier from a first plurality of carriers;
the wireless-enabled device configured to generate a plurality of data packets collectively representing a data file, the plurality of data packets including a first subset of data packets and a second subset of data packets, each data packet in the first subset of data packets and each data packet in the second subset of data packets being associated with a priority indicator indicating a priority of that data packet;
the wireless-enabled device configured to send the first subset of data packets and the second subset of data packets to at least one remote device from a plurality of remote devices, via a plurality of communication paths, each communication path in the plurality of communication paths including a network device from the plurality of network devices and a data connection from the plurality of data connections;
the wireless-enabled device configured to receive, from the at least one remote device from the plurality of remote devices, a set of quantifications of loss associated with the sending of the first and second subsets of data packets to the at least one remote device from the plurality of remote devices;
the wireless-enabled device further configured to send a third subset and a fourth subset of data packets to the at least one remote device from the plurality of remote devices, via the plurality of communication paths, the third subset of data packets and the fourth subset of data packets being selected based on the set of quantifications of loss associated with the sending of the first and second subsets of data packets to the at least one remote device from the plurality of remote devices.

2. The apparatus of claim 1, wherein the quantifications of loss include at least one of a set of statistical probabilities of loss of data packets sent via the plurality of communication paths, a set of measurements of loss of data packets sent via the plurality of communication paths, or a set of measurements of throughput of data packets sent via the plurality of communication paths.

3. The apparatus of claim 1, wherein the second subset of data packets is duplicative of the first subset of data packets with a first amount of duplication, and the fourth subset of data packets is duplicative of the third subset of data packets with a second amount of duplication different from the first amount of duplication, the wireless-enabled device being further configured to determine the second amount of duplication at least partially based on the first amount of duplication and the set of quantifications of loss associated with the sending of the first and second subsets of data packets to the at least one remote device from the plurality of remote devices.

4. The apparatus of claim 3, wherein the wireless-enabled device is further configured to:
determine a first throughput associated with the sending of the first and second subsets of data packets, and a second throughput different from the first throughput and associated with the sending of the third and fourth subsets of data packets;
determine a first reliability associated with the sending of the first and second subsets of data packets, and a second reliability different from the first reliability and associated with the sending of the third and fourth subsets of data packets; and
determine the second amount of duplication to be a factor of at least one quantification of loss from the set of quantifications of loss, the factor being greater than one, such that the second reliability is greater than the first reliability, and the second throughput is lesser than the first throughput.

5. The apparatus of claim 3, wherein the wireless-enabled device is further configured to:
determine a first throughput associated with the sending of the first and second subsets of data packets, and a second throughput different from the first throughput and associated with the sending of the third and fourth subsets of data packets;
determine a first reliability associated with the sending of the first and second subsets of data packets, and a second reliability different from the first reliability and associated with the sending of the third and fourth subsets of data packets; and
determine the second amount of duplication to be a factor of at least one quantification of loss from the set of quantifications of loss, the factor being greater than one, such that the second reliability is lesser than the first reliability, and the second throughput is greater than the first throughput.

6. The apparatus of claim 1, wherein:
the set of quantifications of loss includes at least one user-defined value;
the second subset of data packets is duplicative of the first subset of data packets with a first amount of duplication, and the fourth subset of data packets is duplicative of the third subset of data packets with a second amount of duplication different from the first amount of duplication; and
the wireless-enabled device is further configured to determine the second amount of duplication to be a factor of the user-defined value from the set of quantifications of loss, the factor being greater than one.

7. The apparatus of claim 1, wherein the second subset of data packets is duplicative of the first subset of data packets with a first amount of duplication, and the fourth subset of data packets is duplicative of the third subset of data packets with a second amount of duplication different from the first amount of duplication, the wireless-enabled device configured to determine the second amount of duplication to be greater than the first amount of duplication based on the set of quantifications of loss in data packets received by the at least one remote device from the plurality of remote devices.

8. The apparatus of claim 1, wherein the second subset of data packets is duplicative of the first subset of data packets with a first amount of duplication, and the fourth subset of data packets is duplicative of the third subset of data packets with a second amount of duplication different from the first amount of duplication, the wireless-enabled device configured to:
receive an indication of priority associated with the data file; and
determine the second amount of duplication at least partially based on the indication of priority associated with the data file and the set of quantifications of loss in data packets received from the at least one remote device from the plurality of remote devices.

9. The apparatus of claim 1, wherein the second subset of data packets is duplicative of high priority data packets in the first subset of data packets that are associated with a priority indicator indicating a high-priority of those data packets, and the fourth subset of data packets is duplicative of high priority data packets in the third subset of data packets that are associated with a priority indicator indicating a high-priority of those data packets, such that a high priority data packet includes a high-quality representation of a portion of the data file.

10. The apparatus of claim 1, wherein the plurality of data packets include a real-time stream of data packets.

11. An apparatus, comprising:
a wireless-enabled device, in a network entity at an above-ground altitude, configured to be included in a plurality of data connections with at least one network device from a plurality of network devices, each data connection from the plurality of data connections being associated with a carrier from a first plurality of carriers;
the wireless-enabled device configured to receive, from at least one remote device from a plurality of remote devices, a set of pre-existing quantifications of loss encountered in sending data packets to the plurality of network devices via the plurality of data connections associated with the plurality of carriers;
the wireless-enabled device configured to generate a plurality of data packets collectively representing a data file, the plurality of data packets including a first subset of data packets and a second subset of data packets, the first subset and the second subset of data packets being generated based on the pre-existing quantification of loss received from the at least one remote device from the plurality of remote devices, each data packet in the first subset of data packets and each data packet in the second subset of data packets being associated with a priority indicator indicating a priority of that data packet; and
the wireless-enabled device configured to send the first subset of data packets and the second subset of data packet, via a plurality of communication paths, each communication path in the plurality of communication paths including the at least one network device from the plurality of network devices and a data connection from the plurality of data connections.

12. The apparatus of claim 11, wherein the set of pre-existing quantifications of loss includes statistical probabilities of loss of data packets sent via the plurality of communication paths.

13. The apparatus of claim 11, wherein the second subset of data packets is duplicative of the first subset of data packets with an amount of duplication, the wireless-enabled device being further configured to determine the amount of duplication to be a factor greater than at least one pre-existing quantification of loss from the set of pre-existing quantifications of loss.

14. The apparatus of claim 11, wherein the second subset of data packets is duplicative of the first subset of data packets with an amount of duplication, the wireless-enabled device configured to:
receive an indication of priority associated with the data file; and
determine the amount of duplication at least partially based on the indication of priority associated with the data file and the set of pre-existing quantifications of loss encountered in sending data packets to the plurality of network devices.

15. The apparatus of claim 11, wherein the wireless-enabled device is further configured to receive, information related to each communication path from the plurality of communication paths including an identity of the at least one network device from the plurality of network devices and for that communication path, an identity of data connection from the plurality of data connections and for that communication path, and an identity of carrier from the plurality of carriers associated with the data connection and for that communication path.

16. The apparatus of claim 11, wherein the plurality of data packets includes a real-time stream of data packets.

17. An apparatus, comprising:
a wireless-enabled device, in a network entity at an above-ground altitude, configured to be included in a plurality of data connections with a plurality of network devices, the plurality of network devices being located by the wireless-enabled device based on the above-ground altitude of the network entity, each data connection from the plurality of data connections being associated with a carrier from a plurality of carriers;
the wireless-enabled device configured to generate a plurality of data packets collectively representing a data file, the plurality of data packets including a first subset of data packets and a second subset of data packets, each data packet in the first subset of data packets and each data packet in the second subset of data packets being associated with a priority indicator indicating a priority of that data packet;
the wireless-enabled device configured to send, to the plurality of network devices and via the plurality of data connections, the first subset of data packets and the second subset of data packets, the wireless-enabled device configured to replace portions of the first subset data packets with duplicate portions of the first subset of data packets, each data packet in the duplicate portions of the first subset of data packets having a priority indicator that designates that data packet as a high priority data packet.

18. The apparatus of claim 17, wherein:
the plurality of carriers is a first plurality of carriers;
the plurality of data connections is a first plurality of data connections, the data file being generated by the wireless-enabled device, the wireless-enabled device further configured to alter the above-ground altitude of the network entity, the wireless-enabled device further configured to:
locate, in response to the above-ground altitude of the network entity device being altered, a second plurality of network devices based on the altered above-ground altitude of the network entity;
be included in a second plurality of data connections with the second plurality of network devices, each data connection from the second plurality of data connections being associated with a carrier from a second plurality of carriers; and send a third subset of data packets from the plurality of data packets to a subset of the second plurality of data connections, the third subset of data packets being duplicative of the first subset of data packets.

19. The apparatus of 18 wherein the second plurality of carriers includes at least one carrier that is different from the first plurality of carriers.

20. The apparatus of claim 17, wherein a data packet from the plurality of data packets includes a high-quality representation of a portion of the data file, the priority indicator of that data packet having a high priority.

* * * * *